(12) United States Patent
Shih (10) Patent No.: US 8,308,621 B2
(45) Date of Patent: Nov. 13, 2012

(54) MULTI-SPINDLE MACHINING MACHINE WITH TOOL CHANGING MECHANISM

(75) Inventor: Cheng Hsiu Shih, Taichung (TW)

(73) Assignee: Shenq Fang Yuan Technology Co., Ltd., Taichung (TW)

( * ) Notice: Subject to any disclaimer, the term of this patent is extended or adjusted under 35 U.S.C. 154(b) by 636 days.

(21) Appl. No.: 12/578,583

(22) Filed: Oct. 13, 2009

(65) Prior Publication Data

US 2011/0083307 A1    Apr. 14, 2011

(51) Int. Cl.
*B23Q 3/157* (2006.01)
*B23Q 11/08* (2006.01)
*B23Q 11/10* (2006.01)

(52) U.S. Cl. .......... 483/56; 483/18; 483/3; 483/2; 483/10; 483/12; 409/137; 409/136

(58) Field of Classification Search .......... 483/56, 483/55, 54, 57, 66–67, 18, 3, 2, 11, 10, 7, 483/12; 409/137, 136, 135, 134
See application file for complete search history.

(56) References Cited

U.S. PATENT DOCUMENTS

| | | | | |
|---|---|---|---|---|
| 4,700,452 A | * | 10/1987 | Babel | 483/54 |
| 5,649,887 A | * | 7/1997 | Taki et al. | 483/3 |
| 6,077,206 A | * | 6/2000 | Azema | 483/3 |
| 6,126,526 A | * | 10/2000 | Herrscher et al. | 483/56 |
| 6,387,026 B1 | * | 5/2002 | Schweizer et al. | 483/55 |
| 7,442,154 B2 | * | 10/2008 | Boehler et al. | 483/55 |
| 7,462,145 B2 | * | 12/2008 | Bader et al. | 483/56 |
| 2004/0102297 A1 | * | 5/2004 | Quak et al. | 483/56 |
| 2011/0085863 A1 | * | 4/2011 | Shih | 408/42 |

FOREIGN PATENT DOCUMENTS

GB        2167325 A    *    5/1986

* cited by examiner

*Primary Examiner* — Erica E Cadugan (57) ABSTRACT

A multi-spindle machining machine with a tool changing mechanism comprising a base; a carrier including a seat to move in Z axis, a rotary shaft fixed on the seat laterally to drive the seat to rotate in A axis, and a fixing holder coupled to an end portion of the rotary shaft to fix a workpiece; a tool changing mechanism including a mount mounted to the rotary shaft to rotate with the rotary shaft and a monitor fixed on the seat to measure a length of the tool clamped on the driving spindle, and including a plurality of slots to receive the tools respectively; a working head moving above the carrier and the tool changing mechanism in X and Y axes and including a driving spindle mounted on a lower end thereof to rotate axially, and the lower end of the driving spindle allowing to engage and disengage the tool.

16 Claims, 8 Drawing Sheets

MULTI-SPINDLE MACHINING MACHINE WITH TOOL CHANGING MECHANISM

BACKGROUND OF THE INVENTION

1. Field of the Invention

The present invention relates to an automatic machining machine, and more particularly to a multi-spindle machining machine with a tool changing mechanism which can lower size and production cost and enhance tool changing efficiency.

2. Description of the Prior Art

Conventional tool changing mechanism of a machining machine is disposed within a moving range of a carrier of a base and outside a working range of a working head, and a tool deposit is driven by another set of driving device, thus increasing size, production cost, and tool changing time.

Besides, a height of another conventional machining machine is high to increase the length and the width thereof, thereof also increasing size, production cost, and tool changing time.

The present invention has arisen to mitigate and/or obviate the afore-described disadvantages.

SUMMARY OF THE INVENTION

The primary object of the present invention is to provide a multi-spindle machining machine with a tool changing mechanism which can lower size and production cost and enhance tool changing efficiency.

A multi-spindle machining machine with a tool changing mechanism in accordance with a preferred embodiment of the present invention comprises:

a base;

a carrier including a seat, a rotary shaft, and a fixing holder, the seat allowing to move in Z axis, the rotary shaft being fixed on the seat laterally and driving the seat to rotate in A axis, the fixing holder being coupled to an end portion of the rotary shaft to fix a workpiece thereon;

a tool changing mechanism including a mount and a monitor, the mount being mounted to the rotary shaft so as to rotate with the rotary shaft, and including a plurality of slots to receive the tools respectively, the monitor being fixed on the seat to measure a length of the tool clamped on the driving spindle;

a working head moving above the carrier and the tool changing mechanism in X and Y axes and including a driving spindle mounted on a lower end thereof to rotate axially, and the lower end of the driving spindle allowing to engage and disengage the tool of the tool changing mechanism.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
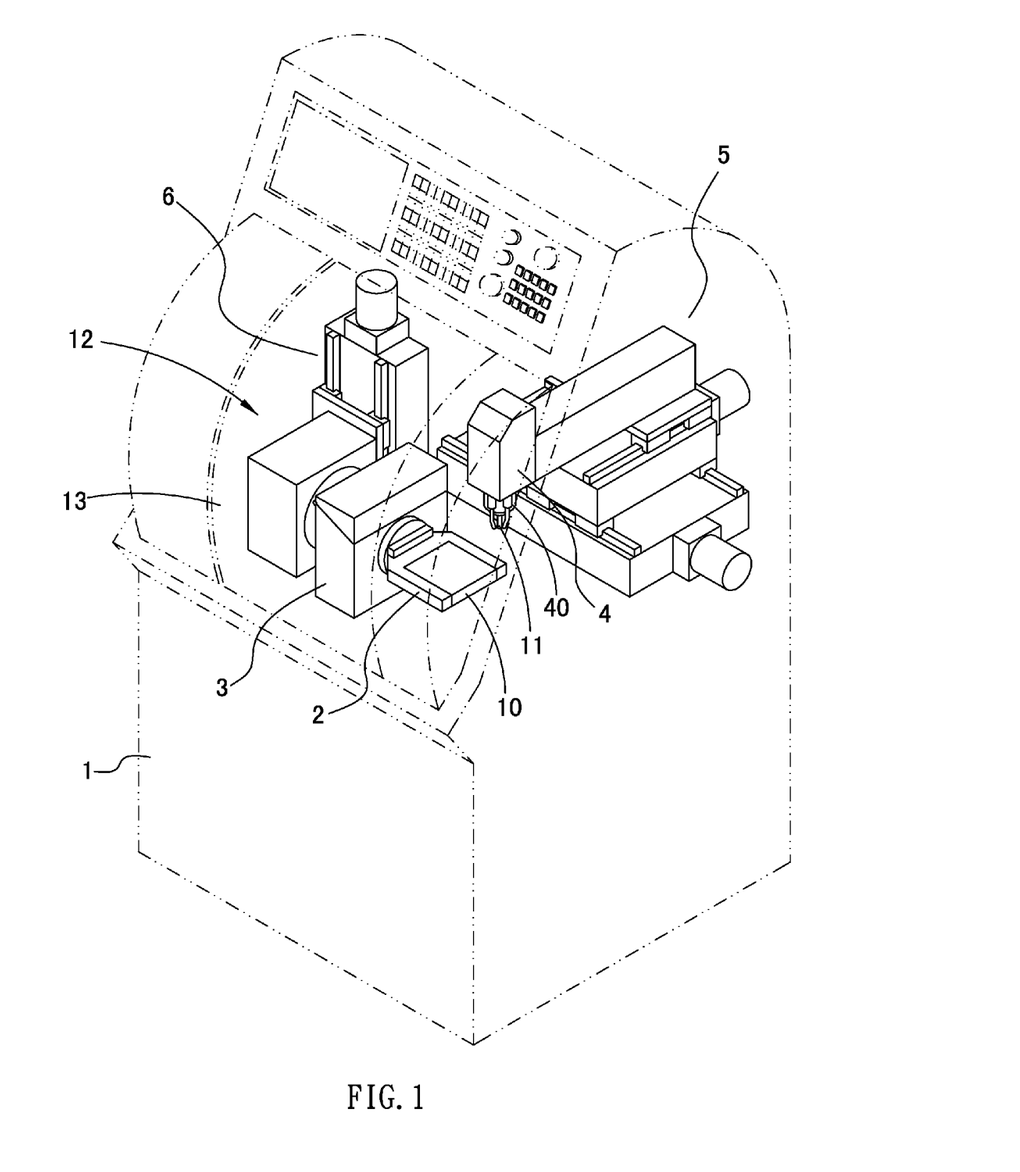
FIG. 1 is a perspective view showing the assembly of a multi-spindle machining machine with a tool changing mechanism in accordance with a first embodiment of the present invention.

Referring to FIG. 1, a multi-spindle machining machine with a tool changing mechanism in accordance with a preferred embodiment of the present invention comprises a base 1, a carrier 2, a tool changing mechanism 3, a working head 4, a lateral driving device 5, and a vertical driving device 6, wherein the base 1 includes a chamber 12 to move the carrier 2 and the working head 4 so as to have a working process therein. The cavity 12 includes a transparent cover 13 disposed on one side thereof to be turned, to monitor the working process and to be opened to install the workpiece 10 onto the carrier 2 or to remove the workpiece 10 from the carrier 2.

The carrier 2 is provided to move the workpiece 10 in the chamber 12 to move in Z axis.

The tool changing mechanism 3 is assembled to the carrier 2 to receive a plurality of tools 11 and to move vertically with the carrier 2. The tool 11 is a milling cutter, a drill, and a grinding cutter, etc.

The working head 4 moves above the carrier 2 and the tool changing mechanism 3 in X and Y axes and includes a driving spindle 40 mounted on a lower end thereof to rotate axially, and the lower end of the driving spindle 40 allows to engage and disengage the tool 11 of the tool changing mechanism 3. The driving spindle 40 allows to clamp the tool 11 to have a cutting, drilling, and grinding process.

The lateral driving device 5 is located on a back side of the chamber 12 to drive the working head 4 to move laterally.

The vertical driving device 6 is located on a left side of the chamber 12 to drive the carrier 2 to move vertically.

Figure 2:
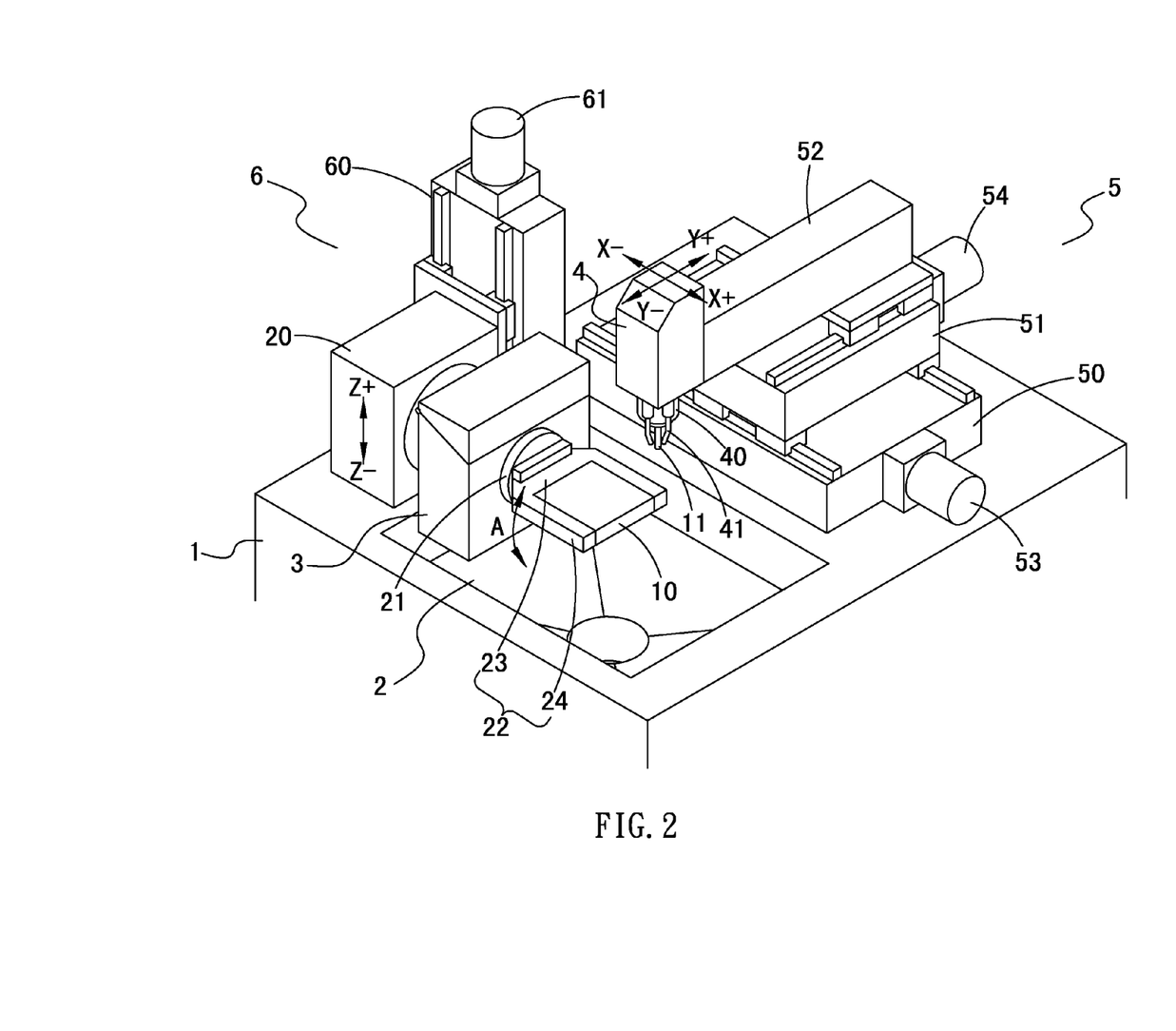
FIG. 2 is a partial amplified view of the multi-spindle machining machine with the tool changing mechanism in accordance with the first embodiment of the present invention.

Referring to FIG. 2, the carrier 2 includes a seat 20, a rotary shaft 21, and a fixing holder 22. The seat 20 allows to move in Z axis, the rotary shaft 21 is fixed on the seat 20 laterally and drives the seat 20 to rotate in A axis by using an air cylinder, and a servo motor. The fixing holder 22 includes a lateral shank 23 and two positioning rods 24, the lateral shank 23 is coupled to the rotary shaft 21, and the two positioning rods 24 extend vertically from two ends of the lateral shank 23 to fix the workpiece 10 thereon so that two upper and lower opposite sides expose between the two positioning rods 24. The fixing holder 22 is designed to have different structures based on different shapes of workpiece 10. For example, the fixing holder 22 is formed in a square shape to match with a circular fixing holder to clamp the workpiece 10, and the fixing holder 22 is formed to match with a cylindrical workpiece to clamp or insert a paw or sleeve.

The working head 4 includes at least one nozzle 41 to spray cutting oil or air.

The lateral driving device 5 includes a first guiding member 50, a second guiding member 51, a work pedestal 52, a first driver 53, and a second driver 54. The first guiding member 50 is mounted on the base 1, the second guiding member 51 is fixed on the first guiding member 50 to move along the X axis. The work pedestal 52 is secured to the second guiding member 51 to move along the Y axis, the first diver 53 is a servo motor and is disposed on the first guiding member 50 to drive the second guiding member 51 to move. The second driver 54 is a serve motor and is fixed on the second guiding member 51 to drive the work pedestal 52 to move. The working head 4 is connected to the work pedestal 52.

The vertical driving device 6 includes a third guiding member 60 and a third driving driver 61. The third guiding member 60 is disposed on the base 1, the seat 20 of the carrier 2 is fixed on the third guiding member 60 to move along the Z axis. The third driver 61 is secured on the third guiding member 60 to drive the seat 20 to move.

Figure 3:
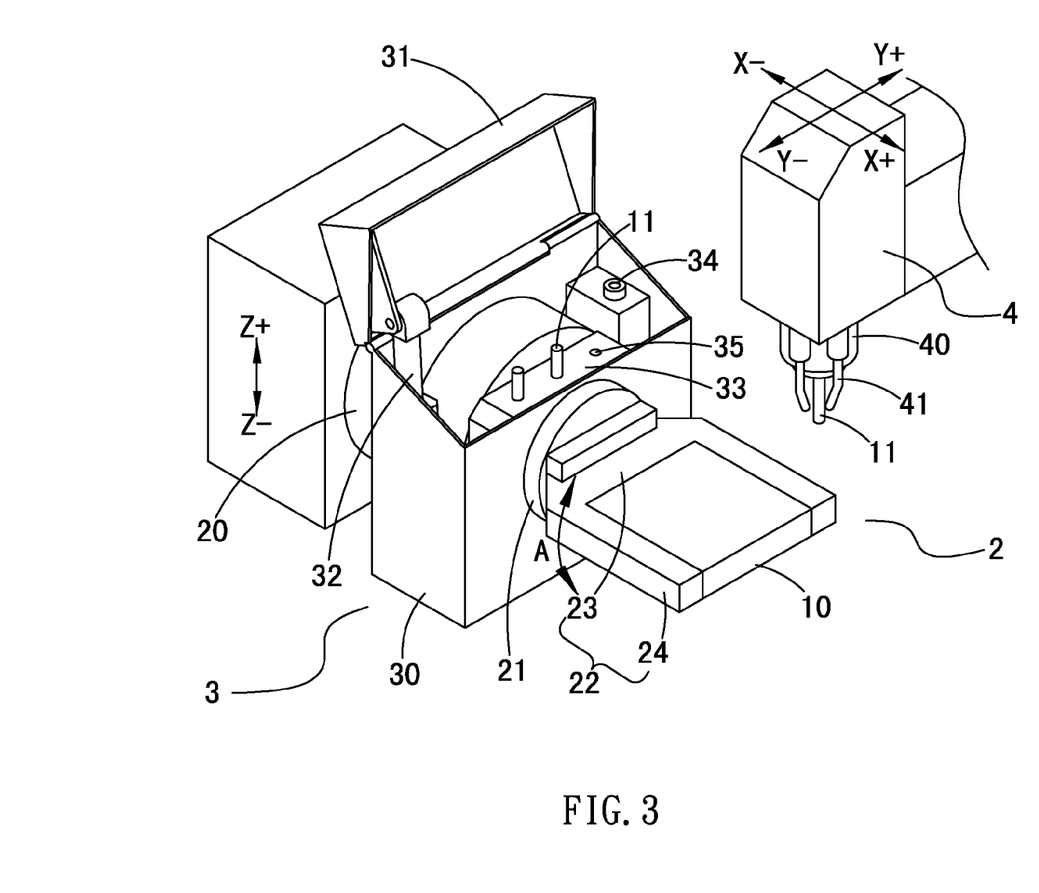
FIG. 3 is an amplified view of a tool changing mechanism of the multi-spindle machining machine in accordance with the first embodiment of the present invention.
Figure 4:
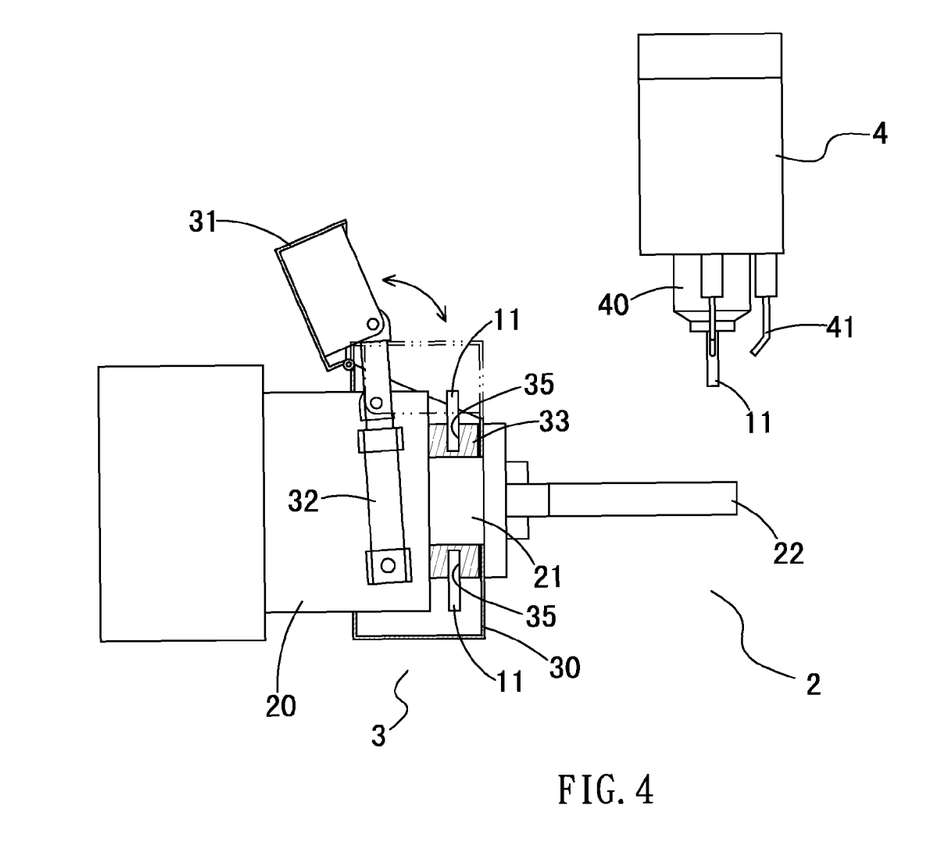
FIG. 4 is a cross sectional view of the tool changing mechanism of the multi-spindle machining machine in accordance with the first embodiment of the present invention.

As shown in FIGS. 3 and 4, the tool changing mechanism 3 includes a case 30, a housing 31, a driving member 32, a mount 33, and a monitor 34, wherein the case 30 is assembled to the seat 20 to be inserted by the rotary shaft 21, and includes an opening formed on an upper end thereof.

The housing 31 is assembled to the case 30 to open or close the opening of the case 30.

The driver 32 is disposed in the case 3 to drive the housing 31 to be open or close the opening of the case 30.

The mount 33 is mounted to the rotary shaft 21 and located at the case 30 to rotate with the rotary shaft 21, and includes a plurality of slots 35 to receive the tools 11 respectively.

The monitor 34 is fixed on the seat 20 and located at the case 30 to measure a length of the tool 11 clamped on the driving spindle 40.

Figure 5:
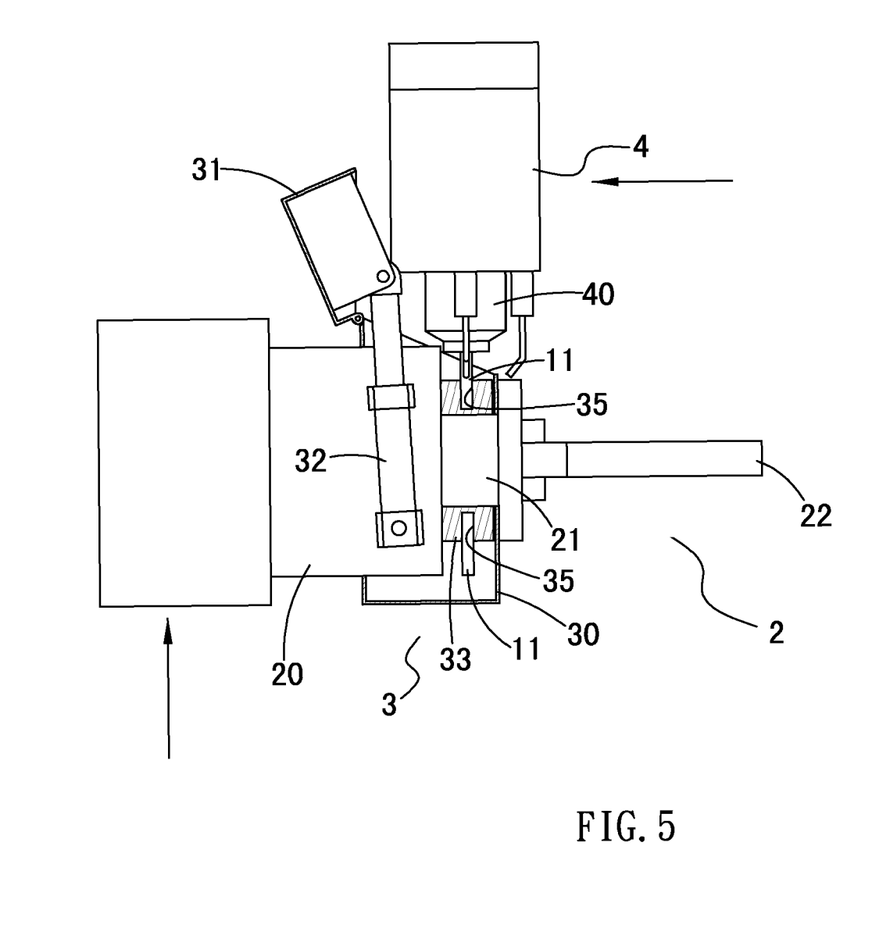
FIG. 5 is a cross sectional view showing the operation of the tool changing mechanism of the multi-spindle machining machine in accordance with the first embodiment of the present invention.

As illustrated in FIGS. 3-5, when changing the tools 11, the driving member 32 drives the housing 31 to open the opening of the case 30, and the working head 4 moves above the case 30 laterally. Thereafter, the seat 20 of the carrier 2 moves upward to insert the tool 11 of the driving spindle 40 to an empty slot 35, and the driving spindle 40 releases the tool 11, and the seat 20 moves downward to make the mount 33 rotate to a desired tool 11 under the driving spindle 40, and then the seat 20 moves upward and the driving spindle 40 engages the tool 11. After the driving spindle 40 engages the tool 11, the seat 20 moves vertically and the working head 4 moves horizontally to cooperate with the monitor 34 to measure the length of the tool 11 on the driving spindle 40, such that the opening of the case 30 is closed to finish onetime of tool changing operation.

Figure 6:
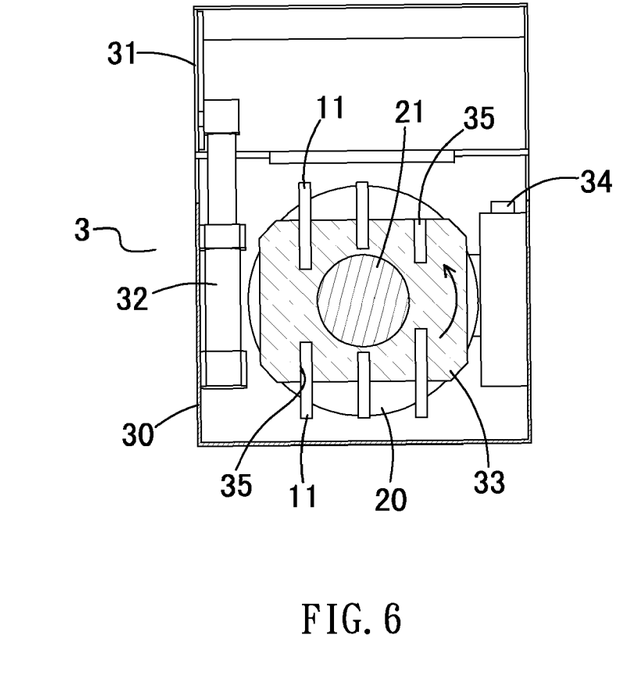
FIG. 6 is a cross sectional view showing a mount of the tool changing mechanism of the multi-spindle machining machine in accordance with a second embodiment of the present invention.

Referring to FIG. 6, a mount 33 of the multi-spindle machining machine with a tool changing mechanism according to a second embodiment of the present invention includes a plurality of slots 35 formed on an upper and a lower side surfaces in a line arrangement, and the rotary shaft 21 actuates the mount 33 to rotate 180 degrees/pre time.

Figure 7:
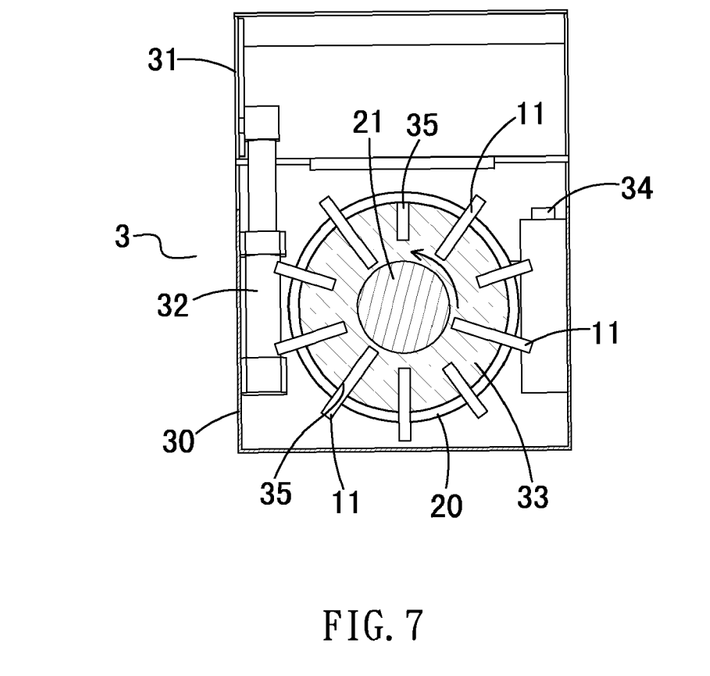
FIG. 7 is another cross sectional view showing the mount of the tool changing mechanism of the multi-spindle machining machine in accordance with a third embodiment of the present invention.

Referring to FIG. 7, a mount 33 of the multi-spindle machining machine with a tool changing mechanism according to a third embodiment of the present invention includes a plurality of slots 35 formed on an upper and a lower side surface in an annularly spaced arrangement, and the rotary shaft 21 actuates the mount 33 to an angle so that a distal end of one of the tools 11 faces upward.

Figure 8:
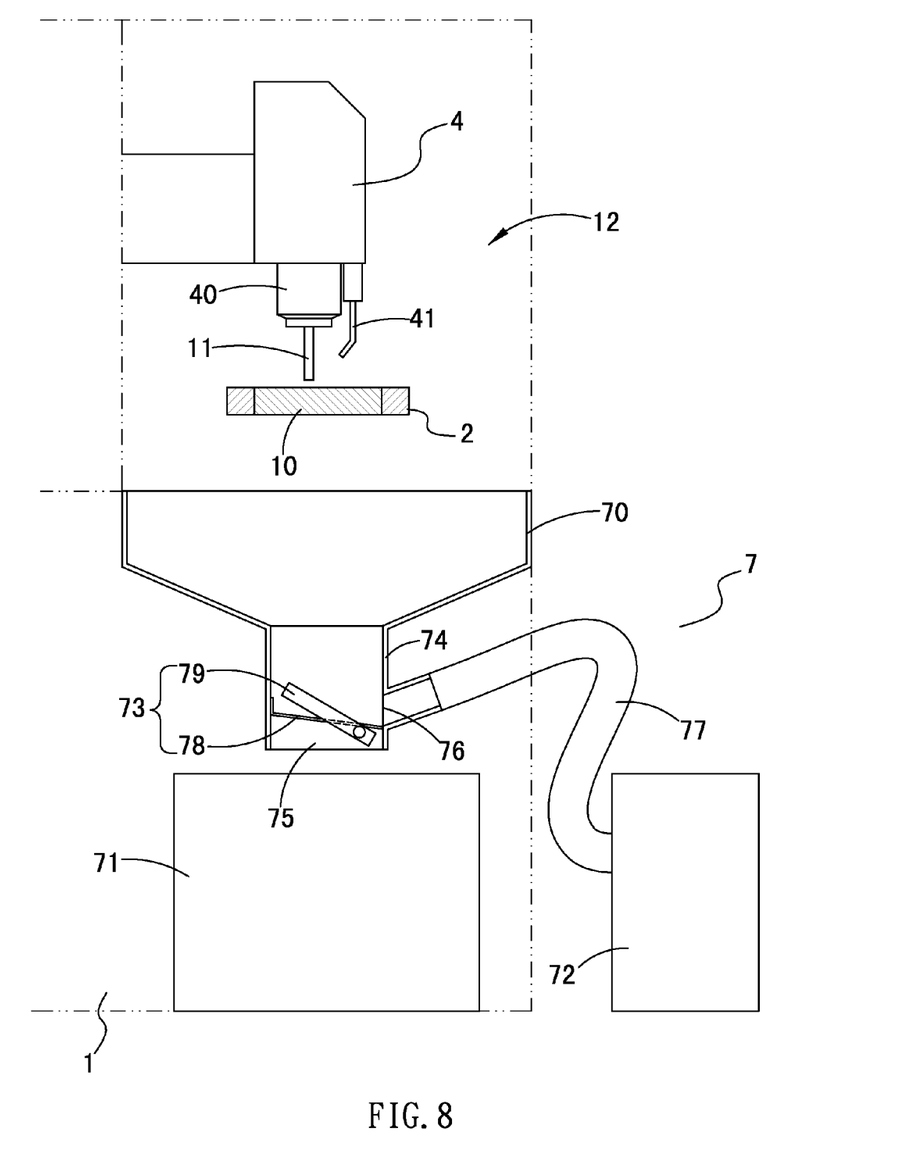
FIG. 8 is a cross sectional view showing the operation of a dust collecting mechanism of the tool changing mechanism of the multi-spindle machining machine in accordance with the first embodiment of the present invention.
Figure 9:
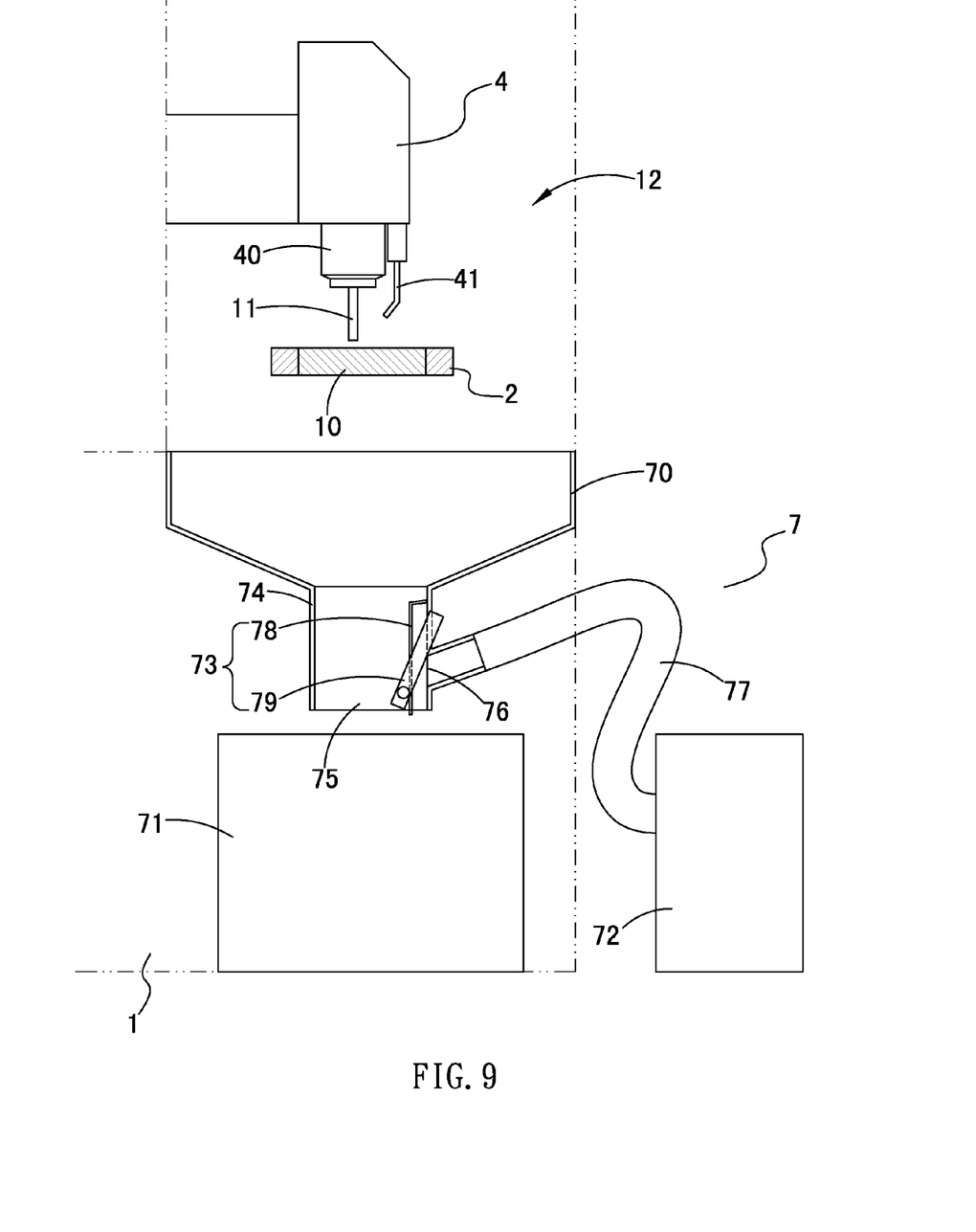
FIG. 9 is another cross sectional view showing the operation of the dust collecting mechanism of the tool changing mechanism of the multi-spindle machining machine in accordance with the first embodiment of the present invention.

With reference to FIGS. 8 and 9, the chamber 12 of the base 1 includes a dust collecting mechanism 7 to collect chips and cutting oil generating from the nozzle 41. The dust collecting mechanism 7 includes a groove 70, a tank 71, a dust collector 72, and a switching device 73, wherein the groove 70 is disposed on a lower side of the carrier 2 of the base 1 and formed in a funnel shape to receive the chips and the cutting oil generating from a working process, and includes a pipe 74 communicating with a bottom portion thereof, the pipe 74 includes a first outlet 75 on a bottom end thereof and a second outlet 76 on a wall of one side thereof.

The tank 71 is located below the first outlet 75 to receive the cutting oil falling from the first outlet 75.

The dust collector 72 is connected to the second outlet 76 by using a connecting pipe 77 so as to draw chips from the second outlet 76.

The switching device 73 includes a plate member 78 and a controlling pillar 79. The plate member 78 is disposed in the pipe 74 to movably cover the first outlet 75 and the second outlet 76. The controlling pillar 79 is disposed outside the pipe 74 to drive the plate member 78 to swing.

As shown in FIG. 8, when the controlling pillar 79 drives the plate member 78 to cover the first outlet 75, the dust collector 72 is started to draw wind and control the nozzle 41 to stop spraying cutting oil, having a dry cutting process.

As illustrated in FIG. 9, when the controlling pillar 79 drives the plate member 78 to cover the second outlet 76, the dust collector 72 is closed automatically to control the nozzle 41 to spray cutting oil, having a wet cutting process.

While we have shown and described various embodiments in accordance with the present invention, it is clear to those skilled in the art that further embodiments may be made without departing from the scope of the present invention.

What is claimed is:

1. A machining machine comprising:
a base;
a carrier including a seat, a rotary shaft, and a fixing holder, the seat being configured to move relative to the base in a Z axis direction, the rotary shaft being fixed on the seat so as to project from the seat laterally with respect to the Z-axis along an A-axis, and the rotary shaft driving the fixing holder to rotate about the A-axis, the fixing holder being coupled to an end portion of the rotary shaft to fix a workpiece on the fixing holder for rotation with the rotary shaft;
a tool changing mechanism including a mount and a monitor, the mount being mounted to the rotary shaft so as to rotate with the rotary shaft, and the mount including a plurality of slots to each receive a respective tool, the monitor being fixed on the seat to measure a length of the tool clamped on a tool driving spindle;
a working head moving above the carrier and the tool changing mechanism, the working head configured to move along X and Y axes that extend orthogonally to the Z axis and each other, and the working head including the tool driving spindle mounted on a lower end thereof to rotate a tool about an axis in order to machine a workpiece mounted on the fixing holder, and the lower end of the driving spindle configured to engage and disengage one of the tools of the tool changing mechanism to exchange a tool between the tool driving spindle and the mount.

2. The machining machine as claimed in claim 1, wherein the tool changing mechanism includes a case and a housing, the case is assembled to the seat and receives the mount and the monitor, and the case includes an opening formed on an upper end thereof, and the housing is assembled to the case in a manner so as to open or close the opening of the case.

3. The machining machine as claimed in claim 2, wherein the slots are formed on an upper side surface and on a lower side surface of the mount in a linear arrangement.

4. The machining machine as claimed in claim 2, wherein the slots are formed on an upper side surface and a lower side surface of the mount in an annularly spaced arrangement.

5. The machining machine as claimed in claim 2 further comprising a lateral driving device and a vertical driving device, the lateral driving device is located on the base to drive the working head to move along the X and Y axes, and the vertical driving device is fixed on the base and located at an end of one side of the lateral driving device to drive the seat to move vertically in the Z direction.

6. The machining machine as claimed in claim 5, wherein the lateral driving device includes a first guiding member, a second guiding member, a pedestal, a first driver, and a second driver, the first guiding member is mounted on the base, the second guiding member is mounted on the first guiding member so as to move along the X axis, the pedestal is mounted to the second guiding member to move along the Y axis, the first driver is disposed on the first guiding member so as to drive the second guiding member to move along the X axis, the second driver is fixed on the second guiding member to drive the pedestal to move along the Y axis, and the working head is connected to the pedestal;

the vertical driving device includes a third guiding member and a third driving driver, the third guiding member is disposed on the base, the seat is mounted on the third guiding member so as to move along the Z axis, the third driver is secured on the third guiding member to drive the seat to move along the Z axis.

7. The machining machine as claimed in claim 6, wherein the working head includes at least one nozzle to spray cutting oil or air, and the machining machine further includes a dust collecting mechanism having a groove, a tank, a dust collector, and a switching device, wherein the groove is disposed in the base at a lower side of the carrier, and the dust collecting mechanism includes a pipe communicating with a bottom portion of the groove, the pipe includes a first outlet on a bottom end of the pipe and a second outlet on a wall of one side of the pipe, the dust collector is connected to the second outlet by using a connecting pipe, the switching device includes a plate member and a controlling pillar, the plate member is disposed in the pipe to selectively and alternatively movably cover the first outlet and the second outlet.

8. The machining machine as claimed in claim 7, wherein when the controlling pillar drives the plate member to cover the first outlet, the dust collector is started to draw wind and the at least one nozzle is controlled to stop spraying the cutting oil; and when the controlling pillar drives the plate member to cover the second outlet, the dust collector is closed automatically in order to control the at least one nozzle to spray the cutting oil.

9. The machining machine as claimed in claim 7, wherein the controlling pillar is disposed outside the pipe to drive the plate member to swing.

10. The machining machine as claimed in claim 2, wherein the fixing holder includes a shank and two positioning rods, the shank is coupled to the rotary shaft, and the two positioning rods extend orthogonally from two ends of the shank to fix the workpiece on the fixing holder.

11. The machining machine as claimed in claim 1 further comprising a lateral driving device and a vertical driving device, the lateral driving device is located on the base to drive the working head to move along the X and Y axes, and the vertical driving device is fixed on the base and located at an end of one side of the lateral driving device to drive the seat to move vertically in the Z direction.

12. The machining machine as claimed in claim 11, wherein the lateral driving device includes a first guiding member, a second guiding member, a pedestal, a first driver, and a second driver, the first guiding member is mounted on the base, the second guiding member is mounted on the first guiding member so as to move along the X axis, the pedestal is mounted to the second guiding member to move along the Y axis, the first driver is disposed on the first guiding member so as to drive the second guiding member to move along the X axis, the second driver is fixed on the second guiding member to drive the pedestal to move along the Y axis, and the working head is connected to the pedestal;

the vertical driving device includes a third guiding member and a third driving driver, the third guiding member is disposed on the base, the seat is mounted on the third guiding member so as to move along the Z axis, the third driver is secured on the third guiding member to drive the seat to move along the Z axis.

13. The machining machine as claimed in claim 12, wherein the working head includes at least one nozzle to spray cutting oil or air, and the machining machine further includes a dust collecting mechanism having a groove, a tank, a dust collector, and a switching device, wherein the groove is disposed in the base at a lower side of the carrier, and the dust collecting mechanism includes a pipe communicating with a bottom portion of the groove, the pipe includes a first outlet on a bottom end of the pipe and a second outlet on a wall of one side of the pipe, the dust collector is connected to the second outlet by using a connecting pipe, the switching device includes a plate member and a controlling pillar, the plate member is disposed in the pipe to selectively and alternatively movably cover the first outlet and the second outlet.

14. The machining machine as claimed in claim 13, wherein when the controlling pillar drives the plate member to cover the first outlet, the dust collector is started to draw wind and the at least one nozzle is controlled to stop spraying the cutting oil; and when the controlling pillar drives the plate member to cover the second outlet, the dust collector is closed automatically in order to control the at least one nozzle to spray the cutting oil.

15. The machining machine as claimed in claim 13, wherein the controlling pillar is disposed outside the pipe to drive the plate member to swing.

16. The machining machine as claimed in claim 1, wherein the fixing holder includes a shank and two positioning rods, the shank is coupled to the rotary shaft, and the two positioning rods extend orthogonally from two ends of the shank to fix the workpiece on the fixing holder.

* * * * *